United States Patent

Wirth et al.

[11] Patent Number: 4,743,640
[45] Date of Patent: May 10, 1988

[54] ALPHA, BETA-UNSATURATED CARBONYL-CONTAINING CARBONATE STABILIZERS FOR CHLORINATED POLYMERS

[75] Inventors: Hermann O. Wirth, Bensheim; Klaus-Peter Michaelis, Lindenfels/Odenwald, both of Fed. Rep. of Germany

[73] Assignee: Ciba-Geigy Corporation, Ardsley, N.Y.

[21] Appl. No.: 920,622

[22] Filed: Oct. 20, 1986

[30] Foreign Application Priority Data

Oct. 30, 1985 [CH] Switzerland .......................... 4659/85

[51] Int. Cl.⁴ .......................... C08K 5/58; C08K 5/01
[52] U.S. Cl. .................... 524/280; 524/181; 524/281; 524/280; 524/397
[58] Field of Search ................ 524/181, 280, 281, 397

[56] References Cited

U.S. PATENT DOCUMENTS 3,746,736 7/1973 Sumimoto et al. .................. 558/276
4,102,839 7/1978 Crochemore et al. .............. 524/354

FOREIGN PATENT DOCUMENTS 2383987 11/1978 France.

OTHER PUBLICATIONS

CA 91 5953h (1979).
Michael, Arthur et al.: J. Am. Chem. Soc. vol. 53, pp. 2394-2415 (1931).
Michael, Arthur et al.: J. Org. Chem. vol. 3, pp. 372-384 (1939).
Minkin, V. I. et al.: Zh. Org. Khim 11(6), 1163-8 (1975).
R. P. Potman et al., J. Org. Chem. 50, 1955 (1985).

*Primary Examiner*—Veronica P. Hoke
*Attorney, Agent, or Firm*—Edward McC. Roberts; Luther A. R. Hall

[57] ABSTRACT

Compounds of formulae Ia and Ib

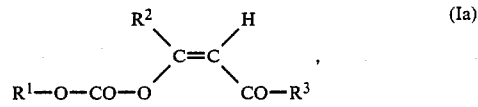

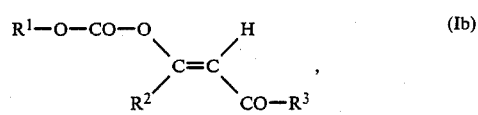

wherein $R^1$ is $C_6$–$C_{22}$alkyl, phenyl or phenyl which is substituted by one or two $C_1$–$C_9$alkyl groups, or is $C_5$–$C_7$cycloalkyl or a group of formula IIa or IIb

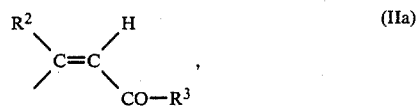

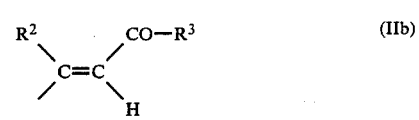

or $R^1$ is a group of formula IIIa or IIIb

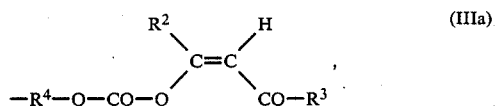

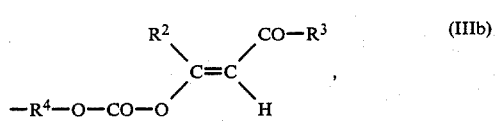

$R^2$ and $R^3$ are each independently of the other $C_1$–$C_{20}$alkyl, phenyl or phenyl which is substituted by one or two $C_1$–$C_9$alkyl groups, or are $C_5$–$C_7$cycloalkyl, and $R^4$ is $C_2$–$C_{12}$alkylene, are suitable for stabilizing chlorinated polymers against light- and/or heat-induced degradation.

6 Claims, No Drawings

ALPHA, BETA-UNSATURATED CARBONYL-CONTAINING CARBONATE STABILIZERS FOR CHLORINATED POLYMERS

The present invention relates to novel unsaturated carbonic acid esters, to the use thereof, and to chlorinated polymers stabilised therewith against the deleterious effects of light and/or heat.

A number of derivatives of unsaturated carbonic acid esters have long been known [q.v. A. Michael et al., J.A.C.S. 53, 2394–2414 (1931)]. For example, the migration of methoxycarbonyl groups in carbonic acid esters has been investigated (q.v. V. J. Minkin, Zh. Org. Khim. 11 (6), 1163–8, (1975)).

The preparation of α,β-unsaturated carbonyl compounds and the use thereof as intermediates for medicaments and as starting materials for polymers has been described in U.S. Pat. No. 3,746,736.

It is known that chlorinated polymers must be protected against light- and heat-induced degradation, especially when being fabricated to moulded articles. Stabilised polyvinyl chloride compositions which contain enol carboxylates of 1,3-diketones are disclosed in French patent specification No. 2 383 987. A heat stabiliser consisting of metal carboxylates and 1,3-diketo compounds for protecting vinyl chloride polymers against thermal degradation is disclosed in U.S. Pat. No. 4,102,839.

It has now been found that surprisingly, specific unsaturated carbonic acid esters are able to enhance the colour stability of chlorinated polymers during thermoplastic processing and on exposure to light.

Specifically, the present invention relates to novel compounds of formulae Ia and Ib

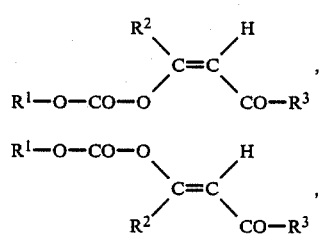

wherein $R^1$ is $C_6$–$C_{22}$alkyl, phenyl or phenyl which is substituted by one or two $C_1$–$C_9$alkyl groups, or is $C_5$–$C_7$cycloalkyl or a group of formula IIa or IIb

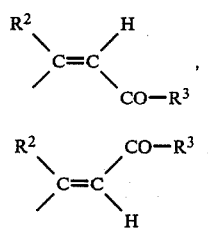

or $R^1$ is a group of formula IIIa or IIIb

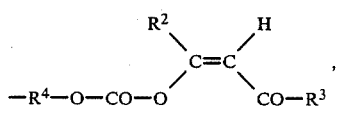

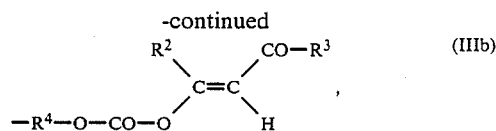

$R^2$ and $R^3$ are each independently of the other $C_1$–$C_{20}$alkyl, phenyl or phenyl which is substituted by one or two $C_1$–$C_9$alkyl groups, or are $C_5$–$C_7$cycloalkyl, and $R^4$ is $C_2$–$C_{12}$alkylene.

Interesting compounds of formulae Ia and Ib are those wherein $R^2$ and $R^3$ are each independently of the other $C_2$–$C_{18}$alkyl, phenyl or phenyl which is substituted by one or two $C_1$–$C_9$alkyl groups, or are $C_5$–$C_7$cycloalkyl.

Preferred compounds of formulae Ia and Ib are those wherein $R^1$ is $C_6$–$C_{22}$alkyl, phenyl or phenyl which is substituted by one or two $C_1$–$C_9$alkyl groups, or is $C_5$–$C_7$cycloalkyl or a group of formula IIIa or IIIb.

Further preferred compounds of formulae Ia and Ib are those wherein $R^1$ is $C_6$–$C_{22}$alkyl, phenyl or phenyl which is substituted by one or two $C_1$–$C_9$alkyl groups, or is $C_5$–$C_7$cycloalkyl.

More especially preferred compounds of formulae Ia and Ib are those wherein $R^1$ is $C_6$–$C_{22}$alkyl, $R^2$ and $R^3$ are each independently of the other $C_1$–$C_4$alkyl, phenyl or phenyl which is substituted by one or two $C_1$–$C_9$alkyl groups.

Particularly interesting compounds of formulae Ia and Ib are those wherein $R^1$ is $C_6$–$C_{16}$alkyl and $R^2$ and $R^3$ are each independently of the other methyl or phenyl.

$R^1$ is preferably a group of formula IIIa or IIIb and is most preferably $C_6$–$C_{22}$alkyl.

Especially preferred compounds of formulae Ia and Ib are those wherein $R^3$ is phenyl or phenyl which is substituted by one or two $C_1$–$C_9$alkyl groups.

$R^1$ as alkyl may be for example hexyl, heptyl, octyl, nonyl, decyl, undecyl, dodecyl, tetradecyl, hexadecyl, eicosyl or docosyl. Preferably $R^1$ is $C_8$–$C_{16}$alkyl and, most preferably, octyl or hexadecyl.

$R^1$, $R^2$ and $R^3$ as phenyl substituted by one or two $C_1$–$C_9$alkyl groups may be for example methylphenyl, dimethylphenyl, methylethylphenyl, ethylphenyl, methylbutylphenyl, dibutylphenyl, butylphenyl or octylphenyl.

$R^1$, $R^2$ and $R^3$ as $C_5$–$C_7$cycloalkyl may be for example cyclopentyl, cyclohexyl or cycloheptyl.

$R^2$ and $R^3$ as $C_1$–$C_{20}$alkyl and, preferably, as $C_1$–$C_4$alkyl may be for example methyl, ethyl, propyl, butyl, pentyl, hexyl, heptyl, octyl, nonyl, decyl, undecyl, dodecyl, tetradecyl, hexadecyl or eicosyl, with methyl being the preferred meaning.

$R^4$ as $C_2$–$C_{12}$alkylene may be for example ethylene, trimethylene, tetramethylene, pentamethylene, hexamethylene, heptamethylene, octamethylene, decamethylene or dodecamethylene.

Representative examples of compounds of formulae Ia and Ib are:
1-n-hexadecyloxycarbonyloxy-1-phenyl-2-benzoylethene,
1-n-hexadecyloxycarbonyloxy-1-methyl-2-benzoylethene,
1-n-hexadecyloxycarbonyloxy-1-methyl-2-acetylethene,
1-(2,2,4-trimethylpentyloxycarbonyloxy)-1-phenyl-2-benzoylethene, 1-(2,2,4-trimethylpentyloxycarbonyloxy)-1-methyl-2-benzoylethene, 1-(2,2,4-trimethylpentyloxycarbonyloxy)-1-methyl-2-acetylethene.

The invention further relates to chlorinated polymers, stabilised against light- and/or heat-induced degradation, which contain one or more compounds of formulae Ia* and/or Ib*

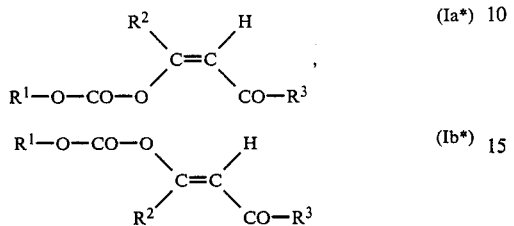

wherein $R^1$ is $C_1$–$C_{22}$alkyl, phenyl or phenyl which is substituted by one or two $C_1$–$C_9$alkyl groups, or is $C_5$–$C_7$cycloalkyl or a group of formula IIa, IIb, IIIa or IIIb, and $R^2$ and $R^3$ are each independently of the other $C_1$–$C_{20}$alkyl, phenyl or phenyl which is substituted by one or two $C_1$–$C_9$alkyl groups, or are $C_5$–$C_7$cycloalkyl, and $R^4$ is $C_2$–$C_{12}$alkylene.

The chlorinated polymers are preferably vinyl chloride homo- or copolymers. Further preferred polymers are suspension and mass polymers as well as emulsion polymers. Examples of suitable comonomers for the copolymers are: vinyl acetate, vinylidene chloride, trans-dichloroethene, ethylene, propylene, butylene, maleic acid, acrylic acid, fumaric acid and itaconic acid. Further suitable chlorinated polymers are post-chlorinated PVC and chlorinated polyolefins, as well as graft polymers of PVC with EVA, ABS and MBS.

It is advantageous to use the compounds of this invention together with known heat stabilisers such as organotin compounds, lead compounds, organic antimony compounds, Me(II) phenolates, preferably $C_7$–$C_{20}$alkylphenolates, e.g. nonylphenolate, or Me(II) carboxylates. Me(II) denotes e.g. Ba, Ca, Mg, Cd or Zn. The carboxylates are preferably salts of $C_7$–$C_{20}$carboxylic acids, e.g. benzoates, alkenoates or alkanoates, preferably stearates, oleates, laurates, palmitates, hydroxystearates or 2-ethylhexanoates. Especially preferred carboxylates are stearates, oleates and p-tert-butylbenzoates.

Typical examples of organotin compounds are:

(I) Organotin mercaptides, especially those of formulae IVa and IVb

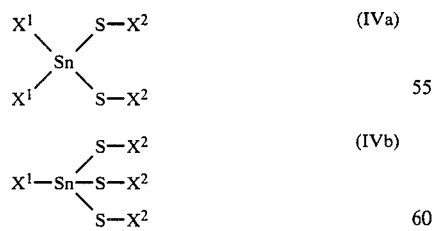

wherein $X^1$ is $C_6$–$C_{20}$alkoxycarbonylalkyl or $C_1$–$C_{20}$alkyl, preferably $C_1$–$C_{12}$alkyl and, most preferably, methyl, n-butyl, n-octyl or n-dodecyl, and $X^2$ is $C_6$–$C_{20}$alkoxycarbonylalkyl, $C_6$–$C_{20}$alkylcarbonyloxyalkyl or $C_4$–$C_{18}$alkyl, preferably isooctyl.

$X^1$ and $X^2$ as $C_6$–$C_{20}$alkoxycarbonylalkyl may be ($C_4$–$C_{17}$alkyl)-O—CO—CH$_2$CH$_2$— or ($C_4$–$C_{18}$alkyl)-O—CO—CH$_2$—, e.g. hexoxycarbonylethyl, isooctoxycarbonylmethyl, isooctoxycarbonylethyl or dodecyloxycarbonylethyl, with isooctoxycarbonylethyl being preferred.

$X^2$ as $C_6$–$C_{20}$alkylcarbonyloxyalkyl may be for example ($C_4$–$C_{17}$alkyl)-CO—O—CH$_2$CH$_2$—, preferably isooctylcarbonyloxyethyl.

Preferred organotin compounds are: methyltin-tris[alkylthioglycolate], n-butyltin-tris[arylthioglycolate], n-butoxycarbonylethyltin-tris[alkylthioglycolate], dimethyltin-bis[alkylthioglycolate], di-n-butyltin-bis[alkylthioglycolate], bis[n-butoxycarbonylethyl]tin-bis[alkylthioglycolate], methyltin-tris[alkylthiopropionate], n-butyltin-tris[alkylthiopropionate], n-butoxycarbonylethyltin-tris[alkylthiopropionate], dimethyltinbis[alkylthiopropionate], di-n-butyltin-bis[alkylthiopropionate] and bis[n-butoxycarbonylethyl]tin-bis[alkylthiopropionate], where alkyl is for example isooctyl (=2-ethyl-n-hexyl), dodecyl, tridecyl or tetradecyl. Particularly preferred organotin compounds are di-n-butyltin-bis[isooctylthioglycolate], n-butyltin-tris[n-tetradecylthioglycolate], di-n-octyltin-bis[isooctylthioglycolate] and n-octyltin-tris[isooctylthioglycolate].

Representative examples of organotin mercaptides are the compounds of formula IVc

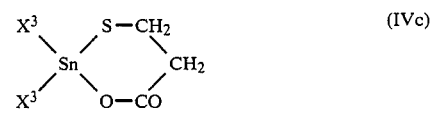

wherein $X^3$ is $C_1$–$C_{20}$alkyl.

(II) Organotin sulfides, e.g. di-($C_1$–$C_{18}$alkyl)tin sulfides and ($C_1$–$C_{18}$alkyl)tin thiostannonic acids, especially the cyclic di-n-butyltin sulfide or formula IVd and the adamantane-like n-butylthiostannonic acid of formula IVe.

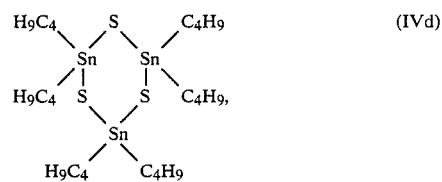

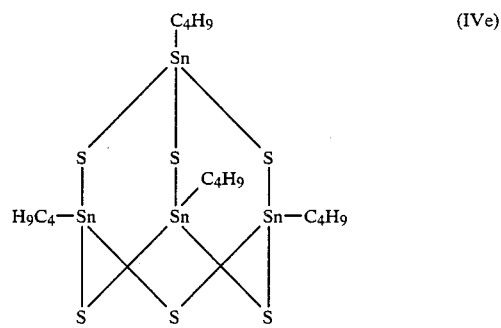

(III) Organotin carboxylates, especially those of formula IVf $$\begin{array}{c} X^4 \\ \diagdown \\ \diagup \\ X^4 \end{array} Sn \begin{array}{c} O-CO-X^5 \\ \diagdown \\ \diagup \\ O-CO-X^5 \end{array} \quad \text{(IVf)}$$

wherein $X^4$ and $X^5$ are $C_1$-$C_{20}$alkyl and $X^5$ is additionally ($C_1$-$C_{20}$alkyl)-O—CO—CH=CH—.

$X^4$ and $X^5$ are preferably $C_1$-$C_{10}$alkyl. Most preferably $X^4$ is n-butyl or n-octyl.

Di-n-butyltin-bis[methylmaleate] is preferred.

Suitable organotin carboxylates are also the compounds of formula IVg $$\begin{array}{c} X^6 \\ \diagdown \\ \diagup \\ X^6 \end{array} Sn \begin{array}{c} O-CO-CH \\ \diagdown \\ \diagup \\ O-CO-CH \end{array} \quad \text{(IVg)}$$

wherein $X^6$ is $C_1$-$C_{20}$alkyl.

Examples of lead compounds are:
tribasic lead sulfate $3PbO.PbSO_4.H_2O$
dibasic lead phosphite $2PbO.PbHPO_3.\tfrac{1}{2}H_2O$
dibasic lead phthalate $2PbO.Pb(OOC)_2C_6H_4$
dibasic lead stearate $2PbO.Pb(OOCC_{17}H_{35})_2$
neutral lead stearate $Pb(OOCC_{17}H_{35})_2$
dibasic lead carbonate $2PbO.PbCO_3$.

Examples of organic antimony compounds are:

Antimony mercaptides, especially compounds of formula IVh $$Sb \begin{array}{c} S-CH_2-COOX^7 \\ S-CH_2-COOX^7 \\ S-CH_2-COOX^7 \end{array} \quad \text{(IVh)}$$

wherein $X^7$ is $C_4$-$C_{18}$alkyl, preferably isooctyl.

It is also advantageous to employ the compounds of the invention together with a mixture of barium/zinc carboxylates, calcium/zinc carboxylates or magnesium/zinc carboxylates. It is especially advantageous if these mixtures additionally contain an organotin compound. Further components of such a stabiliser system that promote a stabilising effect are phosphites such as e.g. triphenylphosphite, tricresylphosphite, tris[p-nonylphenyl]phosphite or tricyclohexylphosphite, and trialkylphosphites, in particular trioctylphosphite, tridecylphosphite, tridodecylphosphite, tritetradecylphosphite, tristearylphosphite or trioleylphosphite and, most preferably, aryldialkylphosphites and alkyldiarylphosphites, e.g. phenyldidecylphosphite, nonylphenyldidecylphosphite, (2,4-di-tert-butylphenyl)didodecylphosphite or (2,6-di-tert-butylphenyl)didodecylphosphite.

Accordingly, the present invention also relates to a chlorinated polymer containing one or more compounds of formulae Ia* and/or Ib* and additionally at least one Me(II) carboxylate, where Me(II) is Ba, Ca, Mg, Cd or Zn.

The invention further relates to a chlorinated polymer containing one or more compounds of formulae Ia* and/or Ib* and additionally at least one organotin compound or an antimony mercaptide.

The incorporation of the stabiliser components into the chlorinated polymer is best effected in conventional manner on a two-roll mill in the temperature range from 150° to 200° C. In general, a sufficiently homogeneous mixture is achieved within 5 to 15 minutes. The addition of the components can be made individually or together as a premix. A liquid premix has proved useful, i.e. processing is carried out in the presence of inert solvents and/or plasticisers.

The material to be stabilised may contain the known heat stabilisers in a concentration which is known to the skilled person, for example in an amount from 0.05 to 5% by weight.

The compounds of formulae Ia* and/or Ib* are incorporated into the chlorinated polymer, for example in an amount from 0.1 to 1% by weight.

The percentage amount by weight is based in each case on the polymers to be stabilised.

The chlorinated polymers may additionally contain customary amounts of conventional PVC stabilisers, for example epoxy compounds, preferably epoxidised fatty acid esters, in particular epoxidised soybean oil, or phenolic antioxidants.

Depending on the utility of the polymers, further adjuvants may also be added before or during incorporation of the stabilisers, for example lubricants (preferably montan waxes or glycerol esters), fatty acid esters, paraffins, plasticisers, fillers, carbon black, asbestos, kaolin, talcum, glass fibres, modifiers (e.g. impact strength additives), fluorescent whitening agents, pigments, light stabilisers, UV absorbers, flame retardants or antistats.

The compounds of formulae Ia, Ia*, Ib and Ib* can be prepared by known methods, for example by the following reaction:

$$R^1-O-\underset{\underset{O}{\|}}{C}-X \; +$$

$$R^2-C=CH-\underset{\underset{O}{\|}}{C}-R^3 \longrightarrow \begin{array}{c} R^1-O-CO-O \\ \diagup \\ \diagdown \\ R^1-O-CO-O \end{array} \begin{array}{c} H \\ \diagdown \\ C=C \\ \diagup \\ R^2 \\ R^2 \\ \diagdown \\ C=C \\ \diagup \\ H \end{array} \begin{array}{c} CO-R^3 \\ \diagdown \\ CO-R^3 \end{array}$$
$$\quad\quad\quad OH$$

or, if $R^1$ is a group of formula IIIa or IIIb, also by reaction of $$X-\underset{\underset{O}{\|}}{C}-O-R^4-O-\underset{\underset{O}{\|}}{C}-X \; \text{with} \; R^2-C=CH-\underset{\underset{O}{\|}}{C}-R_3.$$
$$\quad\quad\quad\quad\quad\quad\quad\quad\quad\quad\quad\quad\quad OH$$

X is e.g. halogen, preferably Cl, and $R^1$, $R^2$, $R^3$ and $R^4$ are as previously defined. The reaction may be preferably conducted in an inert solvent such as for example toluene or dibutyl ether, in the presence of a proton acceptor. Examples of suitable proton acceptors are tertiary amines such as trimethylamine, triethylamine, pyridine, N-methylpyridine and similar compounds. The reaction temperature may be preferably in the range from 0° to 25° C.

The starting materials are commercially available or can be prepared by known methods.

The invention also relates to the use of compounds of formulae Ia* and Ib* for stabilising chlorinated polymers.

The invention is illustrated in more detail by the following Examples, in which parts are by weight unless otherwise indicated.

EXAMPLE 1

Preparation of 1-n-hexadecyloxycarbonyloxy-1-methyl-2-acetylethene (compound 1)

30.4 g (0.1 mole) of n-hexadecyl chloroformate, 15 g (0.15 mole) of acetylacetone and 80 ml of diethyl ether are charged to a 250 ml flask. Then a solution of 11 g (0.11 mole) of triethylamine in 20 ml of diethyl ether is added, with stirring, at a temperature below 10° C. over 25 minutes. The mixture is warmed to room temperature and allowed to stand for 2 days. The precipitate is isolated by filtration and washed with diethyl ether. The residue is triethylamine hydrochloride (13.8 g; theory: 13.8 g). The filtrate is washed twice with water and then dried over $Na_2SO_4$. First the solution is concentrated by rotary evaporation and then the residual acetylacetone and the dietyl ether are distilled off with an oil pump, to give colourless crystals with a melting point of 33°–35° C.

Yield: 32.4 g (=87.9% of theory).

EXAMPLE 2

Preparation of 1-n-hexadecyloxycarbonyloxy-1-phenyl-2-benzoylethene (compound 2)

The preparation is carried out as described in Example 1, using 44.8 g (0.2 mole) of dibenzoyl methane, 61.0 g (0.2 mole) of n-hexadecyl chloroformate and 200 ml of diethyl ether as well as 22 g (0.22 mole) of triethylamine. The resultant yellow viscous liquid crystallises out. The crystals melt at 39°–40° C.

Yield: 95.4 g (=96.8% of theory).

The melting point rises to 44°–45° C. if the product is crystallised from isopropanol.

EXAMPLE 3

Preparation of 1-n-hexadecyloxycarbonyloxy-1-methyl-2-benzoylethene (compound 3)

The preparation is carried out as described in Example 1, using 17.8 g (0.11 mole) of benzoylacetone, 30.5 g (0.1 mole) of n-hexadecyl chloroformate and 100 ml of diethyl ether as well as 11 g (0.11 mole) of triethylamine. The crude product (34.7 g) obtained is recrystallised from a mixture of 85 ml of isopropanol and 10 ml of water. The white crystals melt at 31° C.

Yield: 23.5 g (=55.9% of theory).

EXAMPLE 4

Preparation of 1-(2,2,4-trimethylpentyloxycarbonyloxy)-1-methyl-2-acetylethene (compound 4)

The preparation is carried out as described in Example 1, reacting 2,2,4-trimethylpentylchloroformate with acetylacetone. The product has a boiling point of 104° C. at 0.133 mbar.

The products prepared in Examples 1–4 are obtained in the form of a mixture of cis- and trans-isomers.

EXAMPLE 5

A dry blend consisting of 100 parts of S-PVC (K-value 64), 3 parts of epoxidised soybean oil, 0.35 part of calcium stearate, 0.15 part of zinc stearate, 0.5 part of didecylphenylphosphite and 0.5 part of a stabiliser listed in Table 1 is rolled on a mixer roll for 5 minutes at 180° C. Samples having a thickness of 0.3 mm are taken from the rolled sheet so obtained. The samples are subjected to heat in an oven at 180° C. and, at the specified intervals, the thermal ageing of a sample is determined in accordance with the Yellowness Index (YI) of ASTM D 1925. The results are reported in Table 1.

TABLE 1

| Stabiliser | YI after thermal ageing in minutes | | | | | | |
|---|---|---|---|---|---|---|---|
| | 0 | 5 | 10 | 15 | 20 | 25 | 30 |
| none | 11.6 | 30.7 | 44.9 | | | | |
| compound 1 | 1.2 | 4.1 | 10.1 | 19.6 | 50 | 84 | |
| compound 3 | 2.3 | 9.3 | 14.7 | 18.5 | 22.6 | 62 | 93 |

EXAMPLE 6

A dry blend of the composition as indicated in the following formulations is processed to a sheet on a mixer roll for 5 minutes at 190° C. The sheet is then pressed for 1 minutes at 180° C. and under a pressure of 200 bar to specimen sheets 0.5 mm thick. These specimens are irradiated with light ($\lambda > 290$ nm). The course of the light-induced degradation is determined in accordance with the yellowing that occurs (Yellowness Index of ASTM D 1925-70). The results are reported in Tables 2 and 3 below.

TABLE 2

| Formulation: | | | | | | | | | |
|---|---|---|---|---|---|---|---|---|---|
| S-PVC (K-value 68) | | | | 100 parts | | | | | |
| calcium stearate | | | | 0.35 part | | | | | |
| zinc stearate | | | | 0.15 part | | | | | |
| epoxidised soybean oil | | | | 3.0 parts | | | | | |
| didecylphenylphosphite | | | | 0.55 part | | | | | |

| Stabiliser | stabiliser of the following table | | | | | | | | |
|---|---|---|---|---|---|---|---|---|---|
| | Yellowness Index after exposure time (h) | | | | | | | | |
| | 0 | 24 | 48 | 72 | 96 | 120 | 144 | 168 | 192 |
| none | 21.6 | 24.9 | 28.3 | 31.5 | 34.0 | 37.6 | 41.2 | 44.5 | 47.1 |
| 0.3 part of compound 3 | 15.9 | 21.7 | 24.8 | 27.0 | 28.7 | 30.5 | 32.4 | 34.7 | 36.0 |

TABLE 3

| S-PVC (K-value 68) | | | | 100 parts | | | | | |
|---|---|---|---|---|---|---|---|---|---|
| compound 3 | | | | 0.5 part | | | | | |

| Costabiliser | costabiliser of the following table | | | | | | | | |
|---|---|---|---|---|---|---|---|---|---|
| | Yellowness Index after exposure time (h) | | | | | | | | |
| | 0 | 24 | 48 | 72 | 96 | 120 | 144 | 168 | 192 |
| costabiliser A | 10.6 | 14.9 | 17.8 | 21.1 | 25.0 | 29.4 | 33.9 | 38.6 | 43.2 |
| costabiliser B | 9.7 | 13.3 | 16.5 | 20.3 | 24.5 | 28.9 | 32.7 | 36.5 | 40.2 | costabiliser A: 0.86 part of dibutyltin-bis[isooctylthioglycolate] and 0.14 part of epoxidised isobutyl oleate
costabiliser B: 1 part of n-butyltin-tris[n-tetradecylthioglycolate].

What is claimed is:

1. A composition comprising a chlorinated polymer selected from the group consisting of polyvinylchloride, post-chlorinated polyvinylchloride, chlorinated polyolefins, graft polymers of polyvinylchloride and ethylene-vinylacetate, graft polymers of polyvinylchloride and acrylonitrile-butadiene-styrene, graft polymers of polyvinylchloride and methyl methacrylate-butadiene-styrene, polyvinylchloride/vinyl acetate copolymer, polyvinylchloride/vinylidene chloride copolymer, polyvinylchloride/trans-dichloroethene copolymer, polyvinylchloride/ethylene copolymer, polyvinylchloride/propylene copolymer, polyvinylchloride/butylene copolymer, polyvinylchloride/maleic anhydride copolymer, polyvinylchloride/acrylic acid copolymer, polyvinylchloride/fumaric acid copolymer and polyvinylchloride/itaconic acid copolymer, and an amount which is effective for stabilizing against heat and light degradation of a compound of formulas Ia* and Ib*

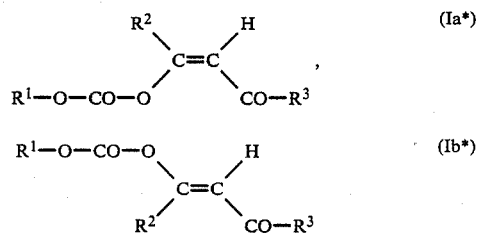

wherein $R^1$ is $C_1$-$C_{22}$alkyl, phenyl or phenyl which is substituted by one or two $C_1$-$C_9$alkyl groups, or is $C_5$-$C_7$cycloalkyl or a group of formula IIa or IIb,

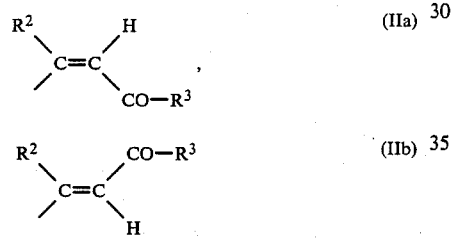

or $R^1$ is a group of formula IIIa or IIIb

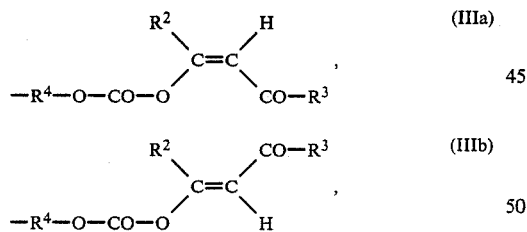

and $R^2$ and $R^3$ are each independently of the other $C_1$-$C_{20}$alkyl, phenyl or phenyl which is substituted by one or two $C_1$-$C_9$alkyl groups, or are $C_5$-$C_7$cycloalkyl, and $R^4$ is $C_2$-$C_{12}$alkylene.

2. A chlorinated polymer according to claim 1, which contains at least one Me(II) carboxylate, wherein Me(II), is Ba, Ca, Mg, Mg, Cd or Zn.

3. A chlorinated polymer according to claim 1, which contains at least one organotin compound.

4. A chlorinated polymer according to claim 1, which contains at least one antimony mercaptide.

5. A chlorinated polymer according to claim 1, wherein the stabilised chlorinated polymer is polyvinyl chloride.

6. A method of stabilizing a chlorinated polymer selected from the group consisting of polyvinylchloride, post-chlorinated polyvinylchloride, chlorinated polyolefins, graft polymers of polyvinylchloride and ethylene-vinylacetate, graft polymers of polyvinylchloride and acrylonitrile-butadiene-styrene, graft polymers of polyvinylchloride and methyl methacrylate-butadiene-styrene, polyvinylchloride/vinyl acetate copolymer, polyvinylchloride/vinylidene chloride copolymer, polyvinylchloride/trans-dichloroethene copolymer, polyvinylchloride/ethylene copolymer, polyvinylchloride/propylene copolymer, polyvinylchloride/butylene copolymer polyvinylchloride//maleic anhydride copolymer, polyvinylchloride/acrylic acid copolymer, polyvinylchloride/fumaric acid copolymer and polyvinylchloride/itaconic acid copolymer, which comprises incorporating therein an amount which is effective for stabilizing against heat and light degradation of a compound of formulas Ia* and Ib*

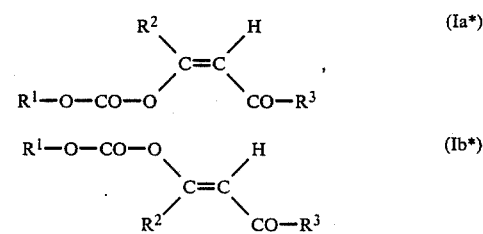

wherein $R^1$ is $C_1$-$C_{22}$alkyl, phenyl or phenyl which is substituted by one or two $C_1$-$C_9$alkyl groups, or is $C_5$-$C_7$cycloalkyl or a group of formula IIa or IIb,

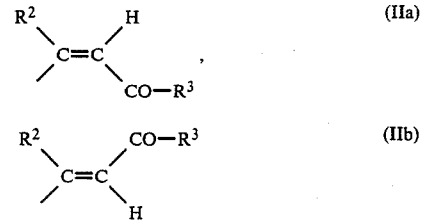

or $R^1$ is a group of formula IIIa or IIIb

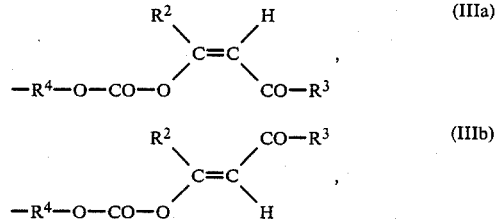

and $R^2$ and $R^3$ are each independently of the other $C_1$-$C_{20}$alkyl, phenyl or phenyl which is substituted by one or two $C_1$-$C_9$alkyl groups, or are $C_5$-$C_7$cycloalkyl, and $R^4$ is $C_2$-$C_{12}$alkylene.

* * * * *